US012654492B2

(12) United States Patent
　　Zueski et al.

(10) Patent No.:　US 12,654,492 B2
(45) Date of Patent:　　Jun. 16, 2026

(54) AXLE ASSEMBLY

(71) Applicant: ArvinMeritor Technology, LLC, Troy, MI (US)

(72) Inventors: David M. Zueski, Troy, MI (US); Dhanapal Vittala Raya, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 322 days.

(21) Appl. No.: 18/490,257

(22) Filed: Oct. 19, 2023

(65) Prior Publication Data

US 2025/0128545 A1　　Apr. 24, 2025

(51) Int. Cl.
　　*B60B 35/16*　　　　(2006.01)
　　*B60B 27/00*　　　　(2006.01)
　　*B60B 35/12*　　　　(2006.01)

(52) U.S. Cl.
　　CPC ........ *B60B 35/166* (2013.01); *B60B 27/0015* (2013.01); *B60B 35/121* (2013.01); *B60B 35/16* (2013.01)

(58) Field of Classification Search
　　CPC ....... B60B 35/121; B60B 35/16; B60B 35/18; B60B 27/0015; B60B 35/166
　　USPC ......................................................... 301/126
　　See application file for complete search history.

(56) References Cited

U.S. PATENT DOCUMENTS

| | | | | |
|---|---|---|---|---|
| 498,589 | A | * 5/1893 | Travis | ................. B60B 27/0005 |
| | | | | 301/126 |
| 1,934,854 | A | * 11/1933 | Holmes | ................... B60B 35/16 |
| | | | | 228/151 |
| 2,763,160 | A | 9/1956 | Petsch | |
| 3,365,986 | A | 1/1968 | Mazziotti | |
| 5,323,076 | A | * 6/1994 | Hajec | ................... H02K 5/1677 |
| | | | | 310/90 |
| 7,412,866 | B2 | * 8/2008 | Jahani | ..................... B60B 35/16 |
| | | | | 72/370.14 |
| 10,316,949 | B2 | 6/2019 | Tiziani et al. | |
| 10,975,942 | B1 | * 4/2021 | Soffner | ................... F16H 48/38 |

FOREIGN PATENT DOCUMENTS

EP　　　　3104043　A1　12/2016

OTHER PUBLICATIONS

Extended European Search Report dated Mar. 12, 2025 for related European Appl No. 24205859.2; 18 Pages.

* cited by examiner

*Primary Examiner* — Jason R Bellinger
(74) *Attorney, Agent, or Firm* — Brooks Kushman P.C.

(57)　　　　　　ABSTRACT

An axle assembly that includes a spindle and an axle shaft. The spindle includes a spindle hole that extends along an axis and a spindle journal that protrudes toward the axis. The axle shaft is disposed in the spindle hole and is rotatable about the axis. The spindle journal cooperates with an axle shaft journal or a seal to restrict lubricant from flowing between the axle shaft and the spindle.

16 Claims, 7 Drawing Sheets

AXLE ASSEMBLY

TECHNICAL FIELD

The invention relates to an axle assembly for a vehicle.

BACKGROUND

A bevel gear wheel assembly is disclosed in U.S. Pat. No. 10,316,949.

SUMMARY

The invention relates to an axle assembly. The axle assembly includes a spindle and an axle shaft. The spindle comprises a spindle hole. The spindle hole extends along an axis. The spindle comprises a spindle journal. The spindle journal protrudes toward the axis. The axle shaft is disposed in the spindle hole. The axle shaft is rotatable about the axis. The axle shaft comprises an axle shaft journal. The axle shaft journal protrudes away from the axis. The axle shaft journal protrudes toward the spindle journal. The axle shaft journal and the spindle journal cooperate to restrict lubricant from flowing between the axle shaft and the spindle.

The axle assembly may further comprise a hub. The hub may be rotatable about the axis with respect to the spindle. The spindle may be disposed inside the hub. The hub may encircle the spindle. The hub may further comprise a hub cavity. The hub cavity may contain lubricant. The axle shaft journal and the spindle journal may cooperate to restrict lubricant from exiting the hub cavity.

The axle journal may encircle the axis. The spindle journal may encircle the axis. The spindle journal may encircle the axle shaft journal. A gap may be provided between the axle shaft journal and the spindle journal.

The spindle may further comprise a free end. The spindle may further comprise an inner side. The inner side may face toward the axis. The inner side may at least partially define the spindle hole. The spindle may further comprise an outer side. The outer side may be disposed opposite the inner side. The spindle may further comprise a drain hole. The drain hole may extend through the spindle from the inner side to the outer side. The drain hole may be axially positioned between the free end of the spindle and the spindle journal.

First and second wheel bearings may encircle the spindle and rotatably support the hub on the spindle. The spindle journal and the axle shaft journal may be axially positioned between the first wheel bearing and the second wheel bearing.

The drain hole may route lubricant from the spindle hole to the first and second wheel bearing assemblies. The drain hole may be axially positioned closer to the free end of the spindle than the spindle journal is axially positioned to the free end.

The axle shaft may further comprise an outer circumferential surface. The outer circumferential surface may face away from the axis. The axle shaft journal may extend farther from the axis than the outer circumferential surface extends from the axis.

The spindle may further comprise a second spindle journal. The second spindle journal may protrude into the spindle hole. The second spindle journal may protrude toward the axis. The second spindle journal may be spaced apart from the spindle journal. The second spindle journal may be axially positioned closer to the free end of the spindle than the spindle journal. The drain hole may be axially positioned between the spindle journal and the second spindle journal.

The axle shaft may further comprise a second axle shaft journal. The second axle shaft journal may protrude away from the axis. The second axle shaft journal may protrude toward the second spindle journal. The second axle shaft journal may be spaced apart from the axle shaft journal. The second axle shaft journal may encircle the axis.

In some configurations, the axle assembly comprises a spindle and an axle shaft. The spindle further comprises an inner side. The inner side extends from a free end of the spindle. The inner side at least partially defines a spindle hole that extends along an axis. The inner side further comprises an inner side surface. The inner side surface is disposed closer to the axis than a remainder of the inner side. The axle shaft is disposed in the spindle hole and is rotatable about the axis. The axle shaft further comprises an axle shaft journal that protrudes away from the axis and toward the inner side surface. The inner side surface and the axle shaft journal cooperate to restrict lubricant from flowing between the axle shaft and the spindle.

The axle assembly may comprise a spindle, an axle shaft, and a seal. The spindle may comprise a spindle hole. The spindle hole may extend along an axis. The spindle may comprise a spindle journal. The spindle journal may be disposed in the spindle hole. The spindle journal may protrude toward the axis. The axle shaft is disposed in the spindle hole. The axle shaft is rotatable about the axis. The axle shaft further comprises a groove. The groove extends toward the axis. The seal is received in the groove. The seal protrudes from the axle shaft toward the spindle journal. The seal and the spindle journal cooperate to restrict lubricant from flowing between the axle shaft and the spindle.

The seal may encircle the axle shaft. The spindle journal may encircle the seal. The seal may contact the spindle journal. The seal may be axially positioned between the free end of the spindle and the second wheel bearing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
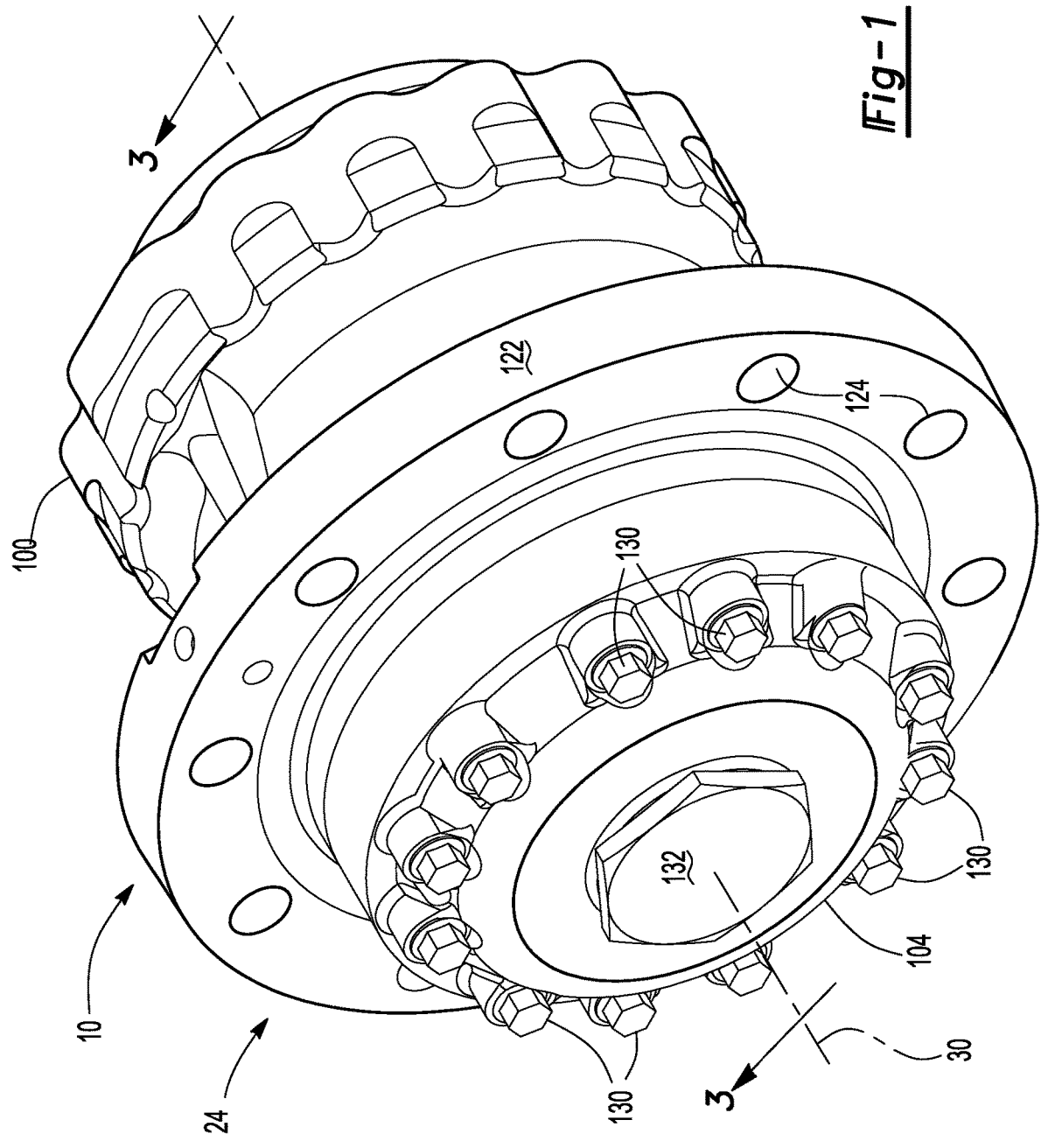
FIG. 1 is a perspective view of an example of a portion of an axle assembly and an example of a wheel end assembly.
Figure 3:
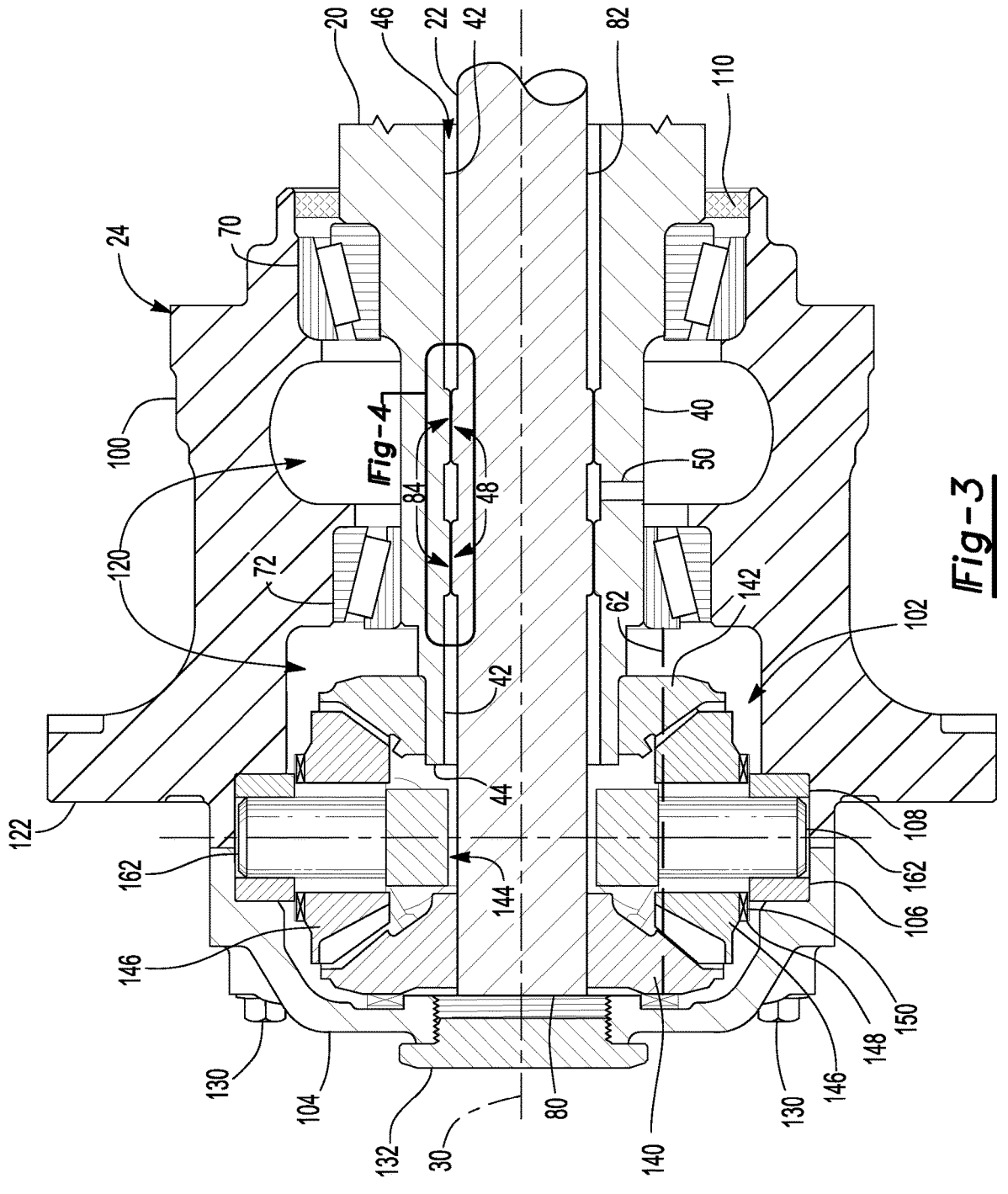
FIG. 3 is a section view along section line 3-3 showing a first configuration of axle assembly.

Referring to FIG. 1, an example of a portion of an axle assembly 10 is shown. The axle assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments. In some configurations and as is best shown in FIG. 3, the axle assembly 10 includes a spindle 20, an axle shaft 22, and a wheel end assembly 24.

The spindle 20 is configured to support the wheel end assembly 24. The spindle 20 may be attached to or may be part of a steerable structural component or a non-steerable structural component. For example, in a steerable configuration, the spindle 20 may be attached to or may be part of a steering knuckle. In a non-steerable configuration, the spindle 20 may be attached to or may be part of a non-steerable knuckle, an axle housing, or the like. The spindle 20 extends around an axis 30. In the configuration shown in FIG. 3, the spindle 20 includes an outer side 40, an inner side 42, a free end 44, a spindle hole 46, and one or more spindle journals 48. The spindle 20 may optionally include a drain hole 50.

The outer side 40 faces away from the axis 30. The outer side 40 may include multiple surfaces.

The inner side 42 is disposed opposite the outer side 40. As such, the inner side 42 faces toward the axis 30 and may encircle the axis 30.

The free end 44 is an end of the spindle 20 that is disposed opposite the structural component. For instance, the free end 44 may be disposed opposite an end of the spindle 20 that is attached to the structural component or extends from the structural component. The free end 44 may be disposed inside the wheel end assembly 24.

The spindle hole 46 extends along the axis 30. For instance, the spindle hole 46 may be a through hole that extends from the free end 44 to the structural component. The inner side 42 at least partially defines the spindle hole 46.

Figure 4:
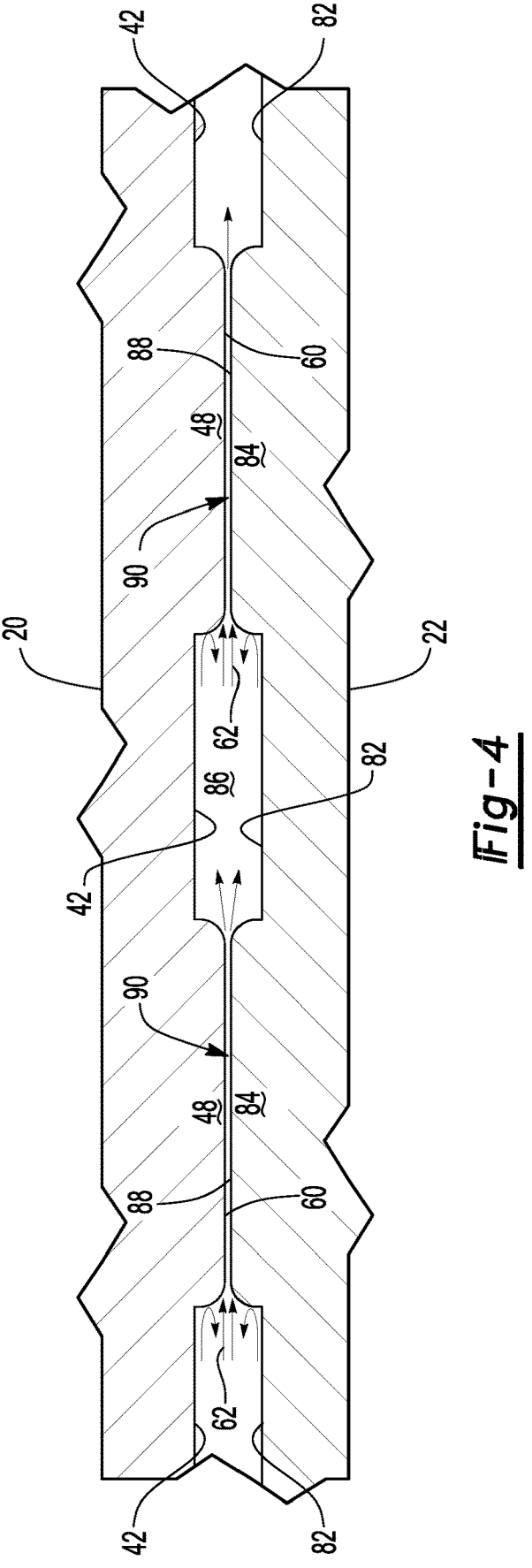
FIG. 4 is a magnified view of a portion of FIG. 3.

Referring primarily to FIGS. 3 and 4, one or more spindle journals 48 may be provided with the spindle 20. In the configuration shown, two spindle journals 48 are illustrated; however, it is contemplated that a greater or lesser number of spindle journals may be provided. For convenience in reference, the spindle journal 48 that is disposed farthest from the free end 44 may be referred to as a first spindle journal 48 and the spindle journal 48 that is disposed closest to the free end 44 may be referred to as a second spindle journal 48. The first spindle journal 48 is spaced apart from the second spindle journal 48.

The spindle journals 48 are disposed in the spindle hole 46 and protrude toward the axis 30. The spindle journal 48 may have an annular or ring-shaped configuration that encircles the axis 30. For instance, a spindle journal 48 may protrude farther toward the axis 30 than an adjacent portion of the inner side 42 from which the spindle journal 48 may extend. In some configurations, the spindle journal 48 has a side 60 that faces toward the axis 30. The side 60 may be disposed substantially parallel to the axis 30 and may encircle the axis 30. The term "substantially parallel" as used herein means the same as or very close to parallel and includes features or axes that are within ±3° of being parallel each other.

Figure 5:
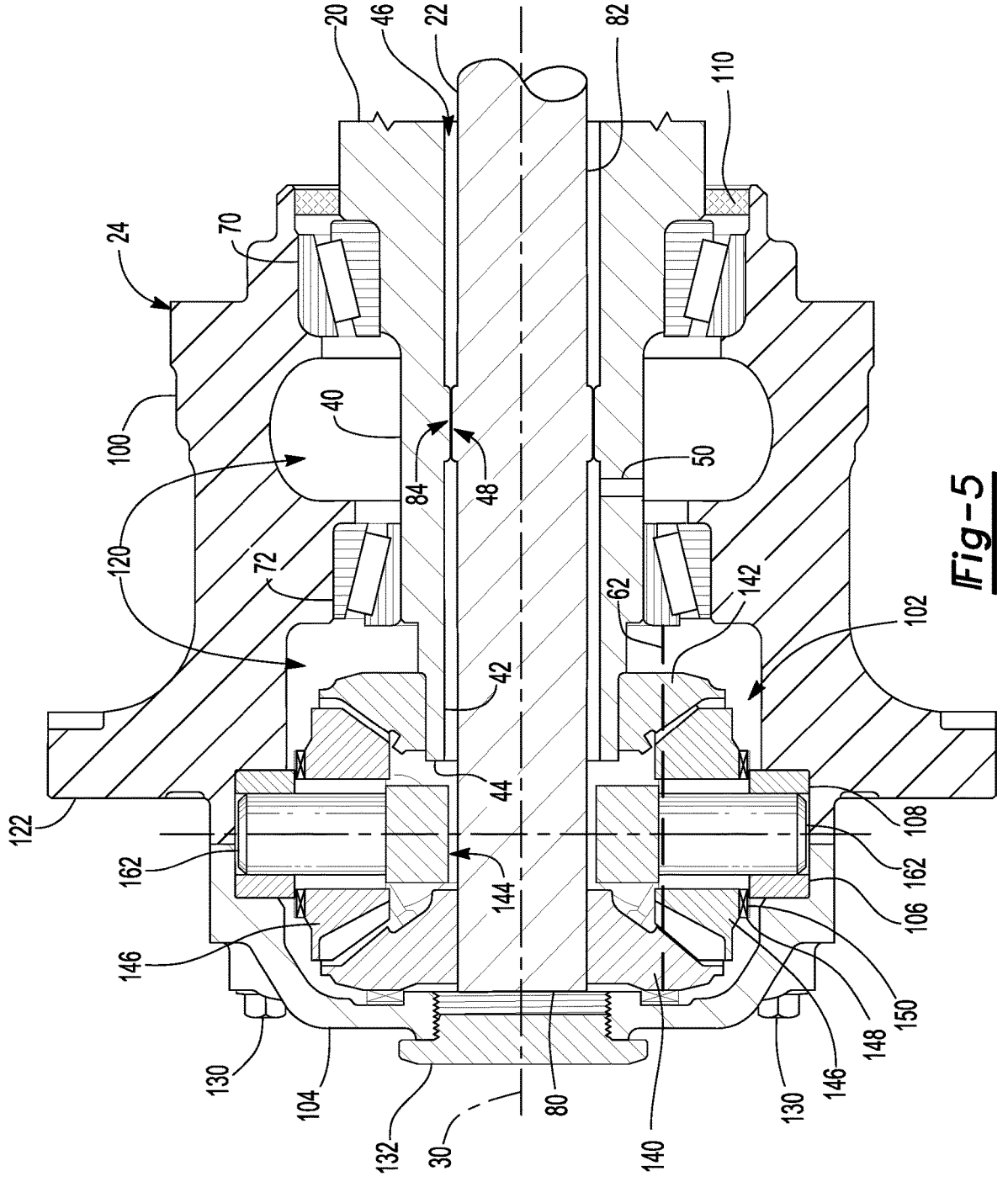
FIG. 5 is a section view showing a second configuration of the axle assembly.

Referring to FIG. 3, the drain hole 50, if provided, is a through hole that extends through the spindle 20 from the outer side 40 to the inner side 42. The drain hole 50 routes lubricant 62 from the spindle hole 46 in a direction that extends away from the axis 30 to help provide lubricant 62 to first and second wheel bearings 70, 72. The drain hole 50 may be axially positioned or positioned in a direction that extends along or parallel to the axis 30 between the free end 44 of the spindle 20 and a spindle journal 48. For instance, in the configuration shown in FIG. 3 the drain hole 50 is axially positioned between the first spindle journal 48 and the second spindle journal 48. In addition, the drain hole 50 may be positioned between the first and second wheel bearings 70, 72. In the configuration shown in FIG. 5, a single spindle journal 48 is illustrated. In such a configuration, the drain hole 50 may be axially positioned closer to the free end 44 of the spindle 20 than the spindle journal 48 is axially positioned to the free end 44.

Referring to FIG. 3, the axle shaft 22 is configured to transmit torque to the wheel end assembly 24. For instance, the axle shaft 22 may be operatively connected to the wheel end assembly 24 at a first end 80 and operatively connected to a vehicle drivetrain component, such as a differential or vehicle power source at a second end that is disposed opposite the first end 80. The axle shaft 22 is disposed in or received inside the spindle hole 46 and is rotatable about the axis 30 with respect to the spindle 20. In some configurations, the axle shaft 22 includes an outer circumferential surface 82 and one or more axle shaft journals 84.

The outer circumferential surface 82 faces away from the axis 30. The outer circumferential surface 82 may be an outside circumference of the axle shaft 22 that encircles the axis 30. In some configurations, the outer circumferential surface 82 has a substantially constant diameter. The outer circumferential surface 82 may be interrupted by an axle shaft journal 84.

Referring primarily to FIGS. 3 and 4, one or more axle shaft journals 84 may be provided with the axle shaft 22. In the configuration shown, two axle shaft journals 84 are illustrated; however, it is contemplated that a greater or lesser number of axle shaft journals may be provided. For convenience in reference, the axle shaft journal 84 that is disposed farthest from the first end 80 of the axle shaft 22 may be referred to as a first axle shaft journal 84 and the axle shaft journal 84 that is disposed closest to the first end 80 may be referred to as a second axle shaft journal 84. The first axle shaft journal 84 is spaced apart from the second axle shaft journal 84 such that a portion of the outer circumferential surface 82 extends from the first axle shaft journal 84 to the second axle shaft journal 84 and such that an axial gap 86 is provided therebetween. The axial gap 86 may extend axially or in a direction that extends parallel to the axis 30 from the first axle shaft journal 84 to the second axle shaft journal 84. The axial gap 86 may also extend axially between the first spindle journal 48 and the second spindle journal 48.

The axle shaft journals 84 are disposed in the spindle hole 46 and protrude away from the axis 30. An axle shaft journal 84 may have an annular or ring-shaped configuration that encircles the axis 30. For instance, an axle shaft journal 84 may protrude farther away from the axis 30 than an adjacent portion of the outer circumferential surface 82 extends from the axis 30. In some configurations, the axle shaft journal 84 has a side 88 that faces away from the axis 30. The side 88 may face toward the side 60 of a corresponding spindle journal 48. In some configurations, the side 88 may be disposed substantially parallel to the side 60 and may encircle the axis 30. Thus, an axle shaft journal 84 may protrude away from the axis 30 and toward a corresponding spindle journal 48 that may protrude toward the axle shaft journal 84. In such a configuration, a spindle journal 48 may encircle a corresponding axle shaft journal 84. As is best shown in FIG. 4, a gap 90 may be provided between an axle shaft journal 84 and a corresponding spindle journal 48 that encircles the axle shaft journal 84. The gap 90 provides clearance between the axle shaft journal 84 and the spindle journal 48 to facilitate rotation of the axle shaft 22 with respect to the spindle 20.

As is best shown in FIG. 3, the axle shaft journals 84 may be completely disposed inside the spindle hole 46. In some configurations, the axle shaft journals 84 may be disposed near a wheel bearing. For instance, the first axle shaft journal 84 may be axially positioned between the first wheel bearing 70 and the second wheel bearing 72. Similarly, the first spindle journal 48 may be axially positioned between the first wheel bearing 70 and the second wheel bearing 72.

An axle shaft journal 84 may be sized to allow the axle shaft 22 to be inserted into the spindle hole 46 from the free end 44 of the spindle 20. For instance, the axle shaft journal 84 may have an outside diameter that is less than the inside diameter of the spindle hole 46 and less than the inside diameter of a spindle journal 48. In some configurations, the outside diameter of the axle shaft journal 84 may be less than or equal to the major diameter of a spline that is provided at an end of the axle shaft 22, such as the end of the axle shaft 22 that engages the differential assembly.

The spindle journal 48 and a corresponding axle shaft journal 84 cooperate to restrict lubricant 62 from flowing or passing between the axle shaft 22 and the spindle 20 or create a flow restriction. Restricting lubricant from flowing or passing may or may not prevent the flow of lubricant 62 through the flow restriction. For instance, some lubricant flow may be permitted but the lubricant flow volume is less than the lubricant flow volume that would be permitted in the absence of one or more journals. The spindle journal 48 and a corresponding axle shaft journal 84 cooperate to decrease the clearance between the spindle 20 and the axle shaft 22 at one or more locations, which reduces the flow of lubricant 62 out of the wheel end assembly 24 and through the spindle hole 46, or to the right from the perspective shown in FIGS. 3 and 4. In some configurations, the axle shaft journal 84 and the spindle journal 48 cooperate to restrict lubricant 62 from exiting a hub cavity 120 that may receive a gear reduction unit 102 as will be discussed in more detail below.

An example of restricting the flow of lubricant 62 is best understood with reference to FIG. 4. In FIG. 4 a magnified view is shown of the spindle journals 48 and axle shaft journals 84 that are shown in FIG. 3. Lubricant 62 is represented by the arrowed lines between the spindle 20 and the axle shaft 22. More arrowed lines are depicted near the left end of FIG. 4, which represents lubricant 62 that enters the spindle hole 46 from the free end 44. In this configuration, the second spindle journal 48 and the second axle shaft journal 84, which are disposed closest to the left end of the perspective shown in FIG. 4, cooperate to restrict the flow of lubricant 62 through the gap 90 therebetween. For instance, the curved arrowed lines may represent lubricant 62 that is redirected by the second spindle journal 48 and/or the second axle shaft journal 84 back toward the free end 44 of the spindle 20. Lubricant 62 that flows through the gap 90 between the second spindle journal 48 and the second axle shaft journal 84 may enter the axial gap 86.

The first spindle journal 48 and the first axle shaft journal 84, which are disposed to the right from the perspective shown in FIG. 4, cooperate to restrict the flow of lubricant 62 through the gap 90 therebetween. The curved arrowed lines in the axial gap 86 represent lubricant 62 that is redirected by the first spindle journal 48 and/or the first axle shaft journal 84 and that does not enter and flow through the gap 90 between the first spindle journal 48 and the first axle shaft journal 84. This lubricant 62 may exit the axial gap 86 via the drain hole 50, if provided, and may be routed to the wheel bearings 70, 72 and may flow through the first wheel bearing 70 back into the hub cavity 120. A single arrowed line is depicted to the right of the first spindle journal 48 and the first axle shaft journal 84 to represent that a limited amount of lubricant 62 may pass through the axial gap 86 therebetween.

Referring to FIGS. 1 and 3, the wheel end assembly 24 is configured to support and facilitate rotation of a vehicle wheel about the axis 30. In some configurations such as that shown in FIG. 3, the wheel end assembly 24 includes a hub 100 and a gear reduction unit 102. Optionally, the wheel end assembly 24 may also include a hub cap 104, a first spider retainer 106, and a second spider retainer 108. The wheel end assembly 24 may also include a hub seal 110.

The hub 100 is rotatable about the axis 30 with respect to the spindle 20 and is configured to facilitate mounting of a wheel. For instance, one or more wheel bearings, such as the first and second wheel bearings 70, 72 may rotatably support the hub 100 on the spindle 20.

The hub 100 may encircle the spindle 20. In some configurations, the hub 100 is operatively connected to an axle shaft 22 via the gear reduction unit 102. In some configurations, the hub 100 includes the hub cavity 120 and a wheel mounting flange 122.

The hub cavity 120 may extend around the axis 30. The hub cavity 120 may receive at least a portion of various components of the wheel end assembly 24, such as the spindle 20, the first and second wheel bearings 70, 72, and the gear reduction unit 102. The hub cavity 120 may also contain lubricant 62, such as oil. The hub cavity 120 may extend axially from the hub seal 110 to the hub cap 104 and radially outward from an interior side of the hub 100, such as to the axis 30.

The wheel mounting flange 122 may facilitate mounting of the wheel. For example, the wheel mounting flange 122 may extend away from the axis 30 and may include a set of mounting fastener holes 124 that may each receive a lug bolt. A lug bolt may extend through a corresponding hole in the wheel. A lug nut may be threaded onto a lug bolt to secure the wheel to the hub 100 in a manner known by those skilled in the art.

The hub cap 104, if provided, encloses an outboard end of the hub cavity 120. As such, the hub 100 and the hub cap 104 may cooperate to define or at least partially define the hub cavity 120. The hub cap 104 may be mounted to the hub 100. For example, the hub cap 104 may engage a side or surface of the hub 100 that faces toward the hub cap 104 and may be secured to the hub 100 with one or more fasteners 130 such as bolts. In some configurations, the hub cap 104 may include an end cap 132 that may cover or enclose an access hole in the hub cap 104.

The gear reduction unit 102 operatively connects the axle shaft 22 to the hub 100 and may provide gear reduction between the axle shaft 22 and the hub 100. The gear reduction unit 102 may be at least partially disposed in the hub 100 and may transmit torque between the axle shaft 22 and the hub 100. In some configurations, the gear reduction unit 102 includes a first side gear 140, a second side gear 142, a spider 144, and one or more pinion gears 146. Optionally, the gear reduction unit 102 may include one or more thrust washers 148, one or more washers 150, or both.

The first side gear 140 is disposed in the hub cavity 120 and is fixedly disposed on the axle shaft 22 such that the first side gear 140 does not rotate with respect to the axle shaft 22. For instance, the first side gear 140 may have a hole that may receive the axle shaft 22 such that the first side gear 140 may rotate with the axle shaft 22. The first side gear 140 may be coupled to the axle shaft 22 in any suitable manner. For example, the first side gear 140 may be fastened to the axle shaft 22 with a fastener, mating splines, interference fit, or the like. The first side gear 140 may also have a set of teeth that may face toward and may be spaced apart from the spider 144. The set of teeth that may be arranged around the axis 30 and may mate or mesh with teeth on one or more pinion gears 146.

The second side gear 142 is also disposed inside the hub cavity 120. The second side gear 142 is fixedly disposed on the spindle 20 such that the second side gear 142 does not rotate with respect to the spindle 20. For instance, the second side gear 142 may have a hole that receives the spindle 20 and may be fastened to the spindle 20 in any suitable manner, such as with fastener, mating spline, interference fit, or the like. The second side gear 142 may also have a set of teeth that may face toward and may be spaced apart from the spider 144. The set of teeth may be arranged around the axis 30 and may mate or mesh with teeth on one or more pinion gears 146.

Figure 2:
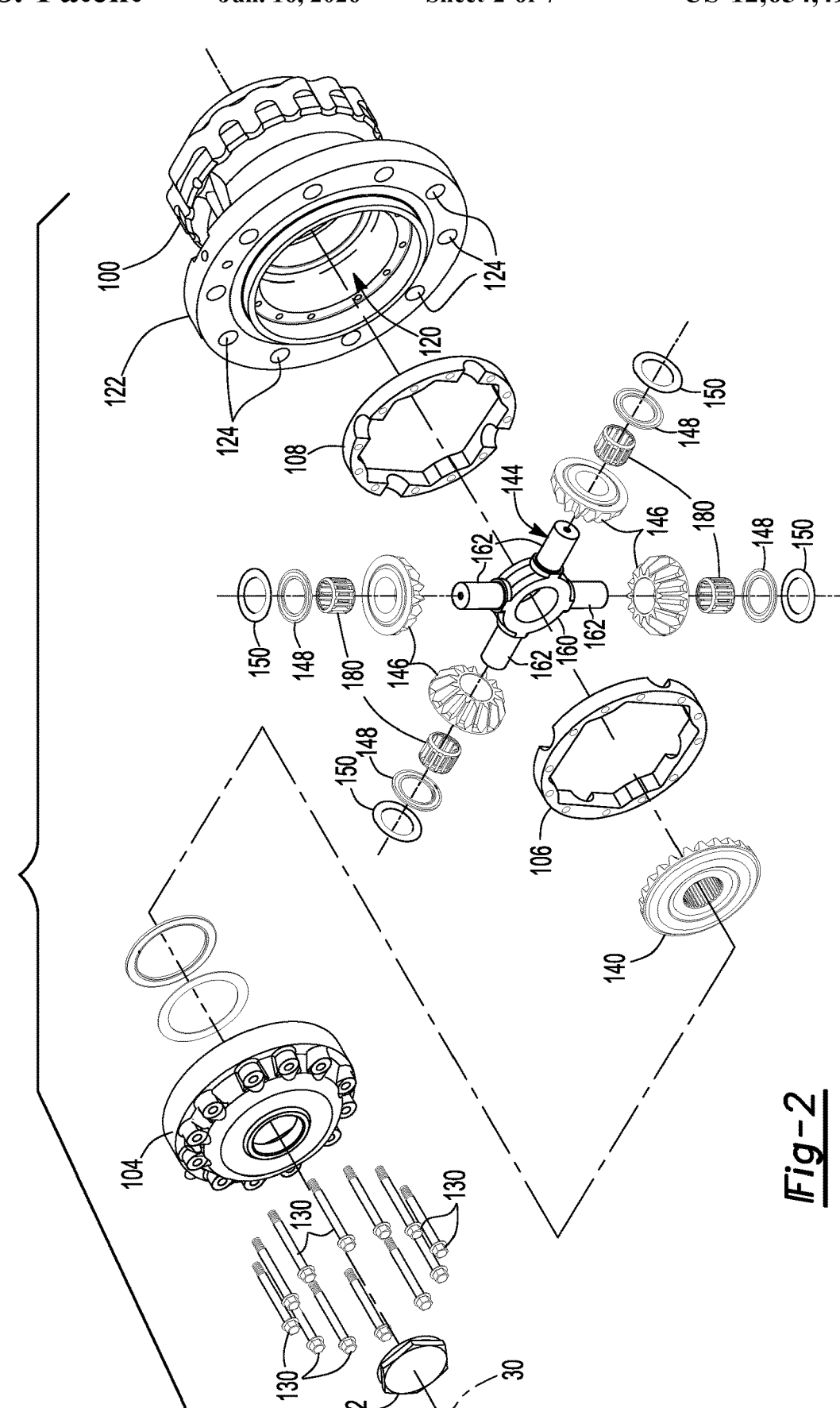
FIG. 2 is an exploded view of the wheel end assembly of FIG. 1.

Referring to FIGS. 2 and 3, the spider 144 is disposed in the hub cavity 120 and may be axially positioned between the first side gear 140 and the second side gear 142. The spider 144 is rotatable about the axis 30 with the hub 100. In some configurations, the spider 144 includes a spider ring 160 and one or more spider shafts 162.

The spider ring 160 encircles the axis 30. The spider ring 160 may define a through hole through which the axle shaft 22 extends. The spider ring 160 may be spaced apart from and rotatable with respect to the axle shaft 22.

One or more spider shafts 162 may extend from the spider ring 160 in a direction that extends away from the axis 30. In FIGS. 3 and 5-7 the spider shafts 162 are not sectioned for clarity. The spider shafts 162 may be coupled to the hub 100 such that the spider 144 is rotatable about the axis 30 with the hub 100. A spider shaft 162 may be secured to the hub 100 in any suitable manner. For instance, a spider shaft 162 received in a hole in the hub 100, received in a hole that is defined by the hub 100 and the hub cap 104 and sandwiched between the hub 100 and the hub cap 104, or sandwiched between other components, such as sandwiched between a first spider retainer 106 and a second spider retainer 108 that are received in the hub cavity 120 and rotatable with the hub 100.

One or more pinion gears 146 are disposed in the hub cavity 120. A pinion gear 146 is rotatably disposed on a corresponding spider shaft 162. For example, each pinion gear 146 may have a pinion gear hole that receives a corresponding spider shaft 162. Optionally, a bearing 180 may be disposed in the pinion gear hole between the spider shaft 162 and the pinion gear 146 to facilitate rotation of the pinion gear 146 with respect to the spider shaft 162. Each pinion gear 146 may include a set of teeth that mate with teeth on the first side gear 140 and teeth on the second side gear 142. As such, the pinion gears 146 may be in meshing engagement with the first side gear 140 and the second side gear 142.

In some configurations, a thrust washer 148, a washer 150, or both, are provided between a pinion gear 146 and a component that is positioned farther away from the axis 30 than pinion gear 146. For instance, a thrust washer 148 may encircle the spider shaft 162 and may extend from the pinion gear 146 in a direction that extends away from the axis 30 while the washer 150 may extend from the thrust washer 148 to the hub 100 or a component that is rotatable with the hub 100, such as the hub cap 104, first spider retainer 106, the second spider retainer 108, or combinations thereof.

Referring to FIG. 3, the hub seal 110 is provided between the hub 100 and the spindle 20 to help keep lubricant 62 in the hub cavity 120 and inhibit contaminants such as water or dirt from entering the hub cavity 120. The hub seal 110 may encircle the axis 30 and may extend from the hub 100 to the spindle 20. The hub seal 110 may be of any suitable type. For instance, the hub seal 110 may be an O-ring, gasket, sealant, such as a silicone sealant, or the like.

Figure 6:
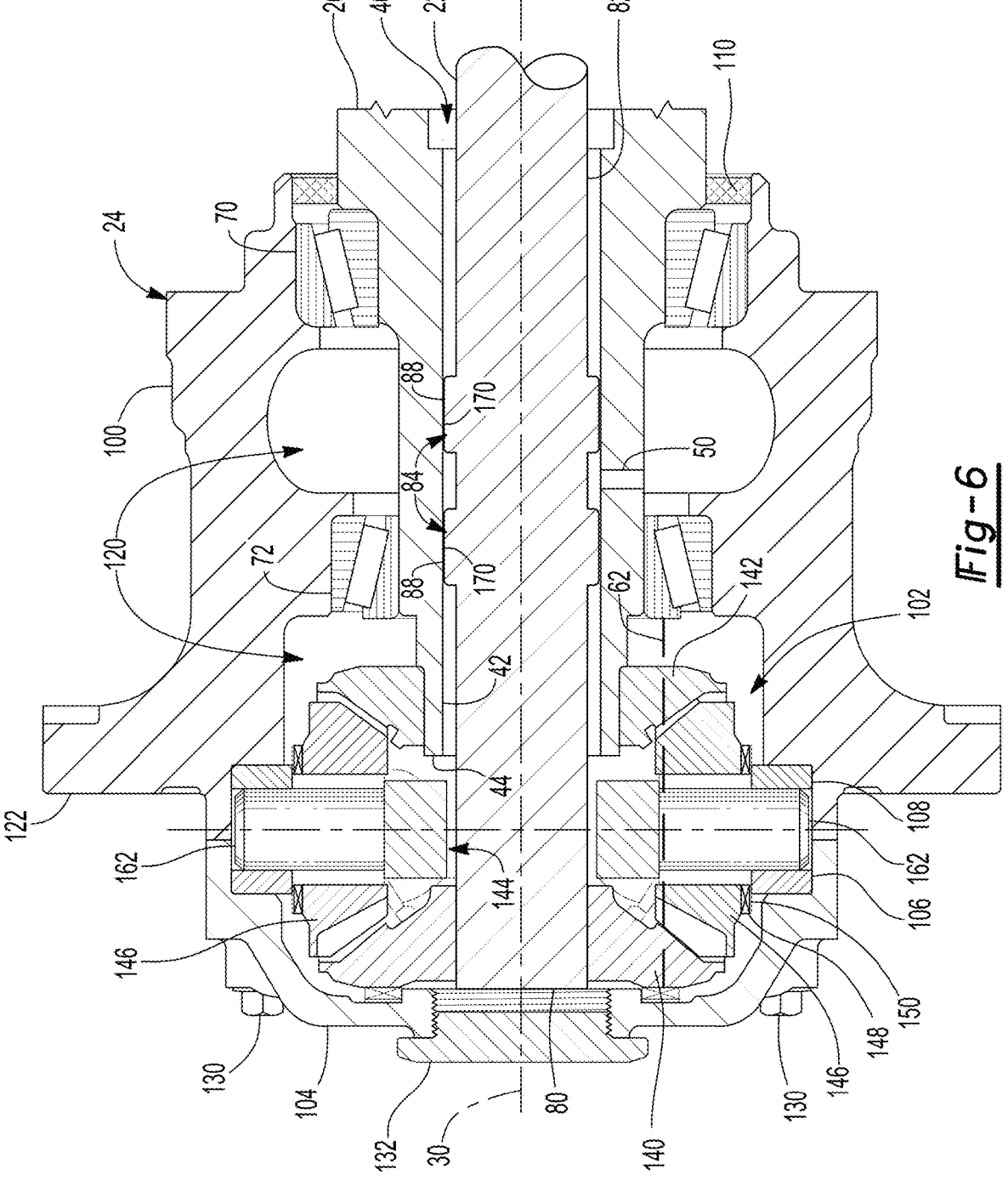
FIG. 6 is a section view showing a third configuration of the axle assembly.

Referring to FIG. 6, another configuration is shown. In this configuration the spindle 20 does not include a spindle journal. In such a configuration, the gap 90 may be provided between the side 88 of the axle shaft journal 84 that faces away from the axis 30 and the inner side 42 of the spindle 20, similar to that shown in FIG. 4. The inner side 42 of the spindle 20 has an inner side surface 170 that may be disposed closer to the axis 30 than the remainder of the inner side 42. It is contemplated that the inner side surface 170 could be the entire inner side 42 when the inner side 42 has a constant diameter. The axle shaft journal 84 protrudes away from the axis 30 toward the inner side surface 170 such that the inner side surface 170 and axle shaft journal cooperate to restrict lubricant 62 from flowing or passing between the axle shaft journal 84 of the axle shaft 22 and the spindle 20.

Figure 7:
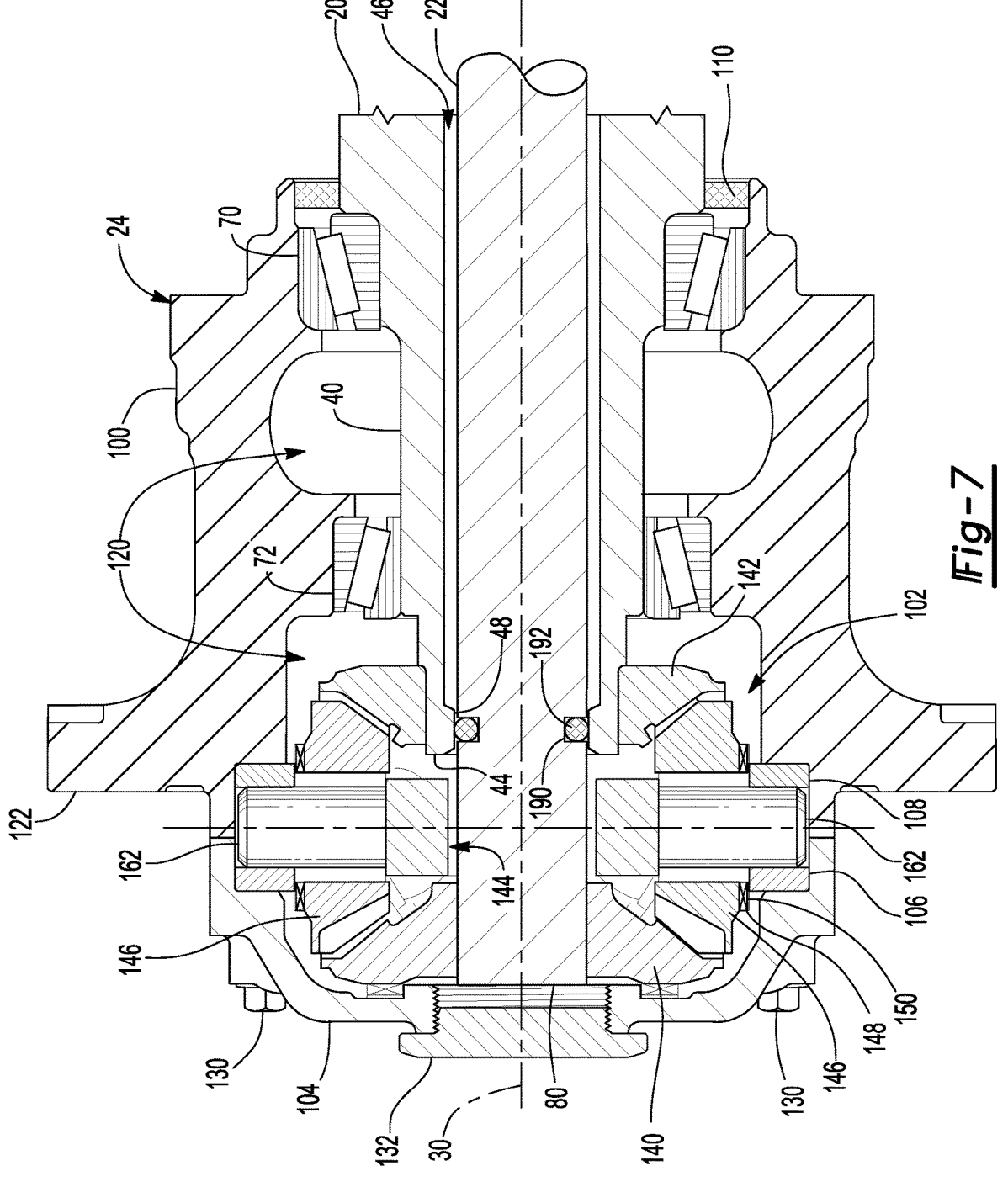
FIG. 7 is a section view showing a fourth configuration of the axle assembly.

Referring to FIG. 7, another configuration is shown. In this configuration, the spindle 20 includes at least one spindle journal 48 as previously described. In FIG. 7, the spindle journal 48 is illustrated as being axially positioned closer to the free end 44 of the spindle 20 than is depicted in FIGS. 3 and 4.

In this configuration, the axle shaft 22 has a groove 190. In some configurations, the groove 190 extends toward the axis 30 from the outer circumferential surface 82 and encircles the axis 30. The groove 190 receives a seal 192. The seal 192 protrudes from the outer circumferential surface 82 of the axle shaft 22 toward the spindle journal 48. The seal 192 may encircle the axis 30 and the axle shaft 22 while the spindle journal 48 encircles the seal 192. The seal 192 and the spindle journal 48 cooperate to restrict lubricant 62 from flowing or passing between the axle shaft 22 and the spindle 20. The seal 192 may contact the spindle journal 48. For instance, the seal 192 may contact the side 60 of the spindle journal 48 that faces toward the axis 30. It is also contemplated that a gap may be provided between the seal 192 and the side 60, similar to the gap 90 previously discussed.

It is also contemplated that the arrangement in FIG. 7 could be reversed and the seal 192 could be provided in a groove in the spindle 20 that extends away from the axis 30 and that the seal 192 could extend to or toward the axle shaft 22 or an axle shaft journal 84 that protrudes from the axle shaft 22.

An axle assembly as described above may help better contain lubricant inside a hub cavity and restrict, limit, or reduce the amount of lubricant that exits the hub cavity. For instance, in an axle assembly in which the spindle is mounted to a tubular arm portion of an axle housing, lubricant may exit the hub cavity and flow through the spindle and the arm portion toward the differential assembly and to the sump portion of the axle housing below the differential assembly. Lubricant that flows into the arm portion is unlikely to return to the hub cavity, thereby resulting a lower volume of lubricant in the hub cavity to lubricate rotating components. The present invention restricts lubricant flow between the spindle and the axle shaft and thereby helps prevent or reduce the amount of lubricant that exits the hub, thereby maintaining a desired lubricant volume in the hub cavity. The present invention may also include a drain hole that helps return lubricant that enters the spindle hole back to the hub cavity, thereby also helping maintain a desired lubricant volume in the hub.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a spindle, the spindle comprising a spindle hole that extends along an axis and a spindle journal that protrudes toward the axis; and
an axle shaft that is disposed in the spindle hole and is rotatable about the axis, the axle shaft further comprising an axle shaft journal that protrudes away from the axis and toward the spindle journal, wherein the axle shaft journal and the spindle journal cooperate to restrict lubricant from flowing between the axle shaft and the spindle.

2. The axle assembly of claim 1 further comprising a hub that is rotatable about the axis with respect to the spindle, wherein the spindle is disposed inside the hub and the hub further comprises a hub cavity that contains lubricant, wherein the axle shaft journal and the spindle journal cooperate to restrict lubricant from exiting the hub cavity.

3. The axle assembly of claim 1 wherein the axle shaft journal encircles the axis.

4. The axle assembly of claim 1 wherein the spindle journal encircles the axis.

5. The axle assembly of claim 1 wherein the spindle journal encircles the axle shaft journal.

6. The axle assembly of claim 1 wherein a gap is provided between the axle shaft journal and the spindle journal.

7. The axle assembly of claim 1 wherein the spindle further comprises a free end, an inner side that faces toward the axis and that at least partially defines the spindle hole, an outer side that is disposed opposite the inner side, and a drain hole that extends through the spindle from the inner side to the outer side, wherein the drain hole is axially positioned between the free end and the spindle journal.

8. The axle assembly of claim 7 further comprising a hub that encircles the spindle and is rotatable about the axis with respect to the spindle, and first and second wheel bearings that encircle the spindle and rotatably support the hub on the spindle, wherein the spindle journal and the axle shaft journal are axially positioned between the first wheel bearing and the second wheel bearing.

9. The axle assembly of claim 8 wherein the drain hole routes lubricant from the spindle hole to the first and second wheel bearings.

10. The axle assembly of claim 8 wherein the drain hole is axially positioned closer to the free end of the spindle than the spindle journal is axially positioned to the free end of the spindle.

11. The axle assembly of claim 1 wherein the axle shaft further comprises an outer circumferential surface that faces away from the axis and the axle shaft journal extends farther from the axis than the outer circumferential surface extends from the axis.

12. The axle assembly of claim 1 wherein the spindle further comprises a free end, an inner side that faces toward the axis and at least partially defines the spindle hole, and a second spindle journal that protrudes into the spindle hole and toward the axis, wherein the second spindle journal is spaced apart from the spindle journal.

13. The axle assembly of claim 12 wherein the spindle further comprises an outer side that is disposed opposite the inner side and that faces away from the axis and a drain hole that extends through the spindle from the inner side to the outer side, wherein the drain hole is axially positioned between the spindle journal and the second spindle journal.

14. The axle assembly of claim 12 wherein the axle shaft further comprises a second axle shaft journal that protrudes away from the axis toward the second spindle journal, wherein the second axle shaft journal is spaced apart from the axle shaft journal.

15. The axle assembly of claim 14 wherein the second axle shaft journal encircles the axis.

16. An axle assembly comprising:
a spindle, the spindle comprising an inner side that extends from a free end of the spindle and that at least partially defines a spindle hole that extends along an axis, wherein the inner side includes an inner side surface that is disposed closer to the axis than a remainder of the inner side; and
an axle shaft that is disposed in the spindle hole and is rotatable about the axis, the axle shaft further comprising an axle shaft journal that protrudes away from the axis and toward the inner side surface, wherein the inner side surface and the axle shaft journal cooperate to restrict lubricant from flowing between the axle shaft and the spindle.

* * * * *